United States Patent
Palaoro

(10) Patent No.: US 8,047,247 B2
(45) Date of Patent: Nov. 1, 2011

(54) TIRE VALVE HAVING A STEPPED SHOULDER

(75) Inventor: Renato Palaoro, Heidenheim a.d. Brenz (DE)

(73) Assignee: Alligator Ventilfabrik GmbH, Giengen/Brenz (DE)

( * ) Notice: Subject to any disclaimer, the term of this patent is extended or adjusted under 35 U.S.C. 154(b) by 172 days.

(21) Appl. No.: 12/295,414

(22) PCT Filed: Mar. 29, 2007

(86) PCT No.: PCT/EP2007/002776
§ 371 (c)(1),
(2), (4) Date: Sep. 30, 2008

(87) PCT Pub. No.: WO2007/112920
PCT Pub. Date: Oct. 11, 2007

(65) Prior Publication Data
US 2009/0115239 A1    May 7, 2009

(30) Foreign Application Priority Data
Mar. 30, 2006  (DE) .................. 20 2006 005 269 U

(51) Int. Cl.
*F16K 15/20* (2006.01)
(52) U.S. Cl. .................................................. 152/427
(58) Field of Classification Search ............ 152/145, 152/416, 417, 418, 427, 428, 429; 137/223, 137/230; 277/910
See application file for complete search history.

(56) References Cited

U.S. PATENT DOCUMENTS

| | | | | | |
|---|---|---|---|---|---|
| 2,928,447 | A | * | 3/1960 | Hosking | 152/427 |
| 2,988,126 | A | * | 6/1961 | Wells et al. | 152/427 |
| 3,019,832 | A | * | 2/1962 | Williams | 152/427 |
| 3,489,197 | A | * | 1/1970 | Kenney | 152/427 |
| 3,542,109 | A | * | 11/1970 | Stroh | 152/427 |
| 4,049,037 | A | * | 9/1977 | Gale et al. | 152/427 |
| 4,538,658 | A | * | 9/1985 | Earley | 152/427 |
| 6,966,331 | B2 | * | 11/2005 | Simmons et al. | 137/232 |
| 7,234,485 | B2 | * | 6/2007 | Yamamoto et al. | 137/223 |
| 2003/0192590 | A1 | | 10/2003 | Simmons et al. | |

FOREIGN PATENT DOCUMENTS

| | | |
|---|---|---|
| DE | 28 13 742 A1 | 10/1978 |
| DE | 103 14 783 A1 | 2/2004 |
| DE | 20 2004 020 121 U1 | 3/2005 |
| FR | 2 843 439 A1 | 2/2004 |
| GB | 591927 | 9/1947 |

* cited by examiner

*Primary Examiner* — Russell Stormer
(74) *Attorney, Agent, or Firm* — Bachman & LaPointe, P.C.

(57) ABSTRACT

The invention relates to a tire valve (10) comprising a valve body (11) which penetrates a bore (21) of a rim (20), particularly a vehicle rim, embodies a bottom valve body section (13) that is disposed on one side (23) of the rim (20), particularly in the interior of the rim, in the mounted state as well as a top valve body section (15) that protrudes from the rim bore (21), and is configured so as to cooperate with a cap nut (17) in the area of the top valve body section (15). The bottom valve body section (13) forms a stop collar (19) which is used as an abutment for a flat peripheral section (27) of the rim bore (21) and widens the bottom valve body section (13) relative to the top valve body section (15) beyond an internal width of the rim bore (21). The peripheral section (27) of the rim bore (21) can be braced against said stop collar (19) by tightening the cap nut (17).

18 Claims, 3 Drawing Sheets

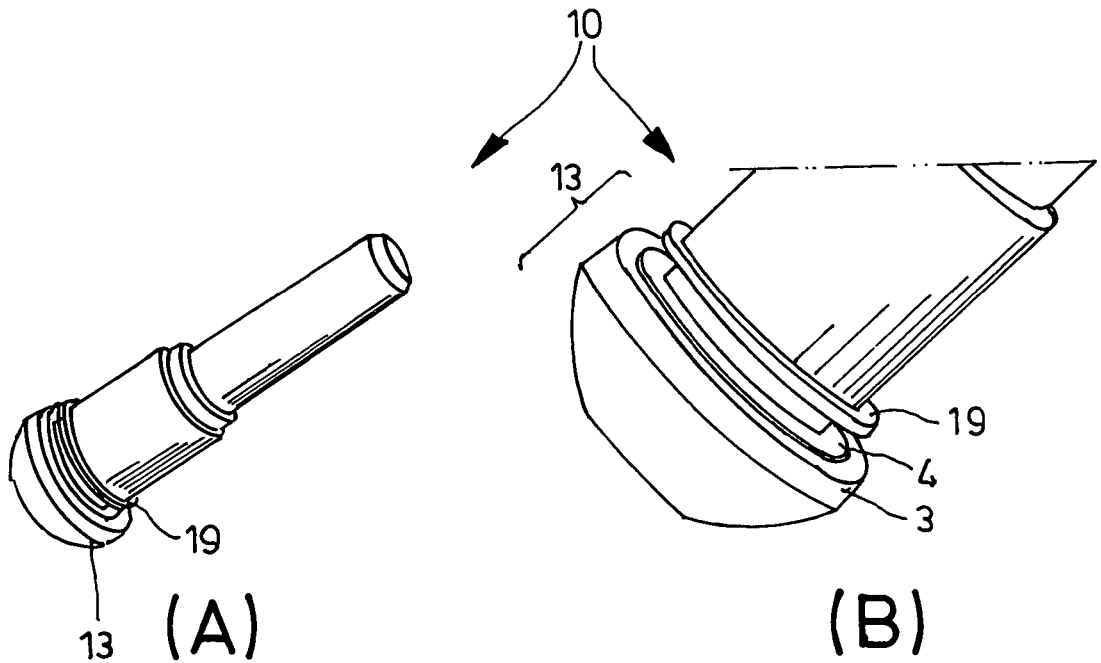
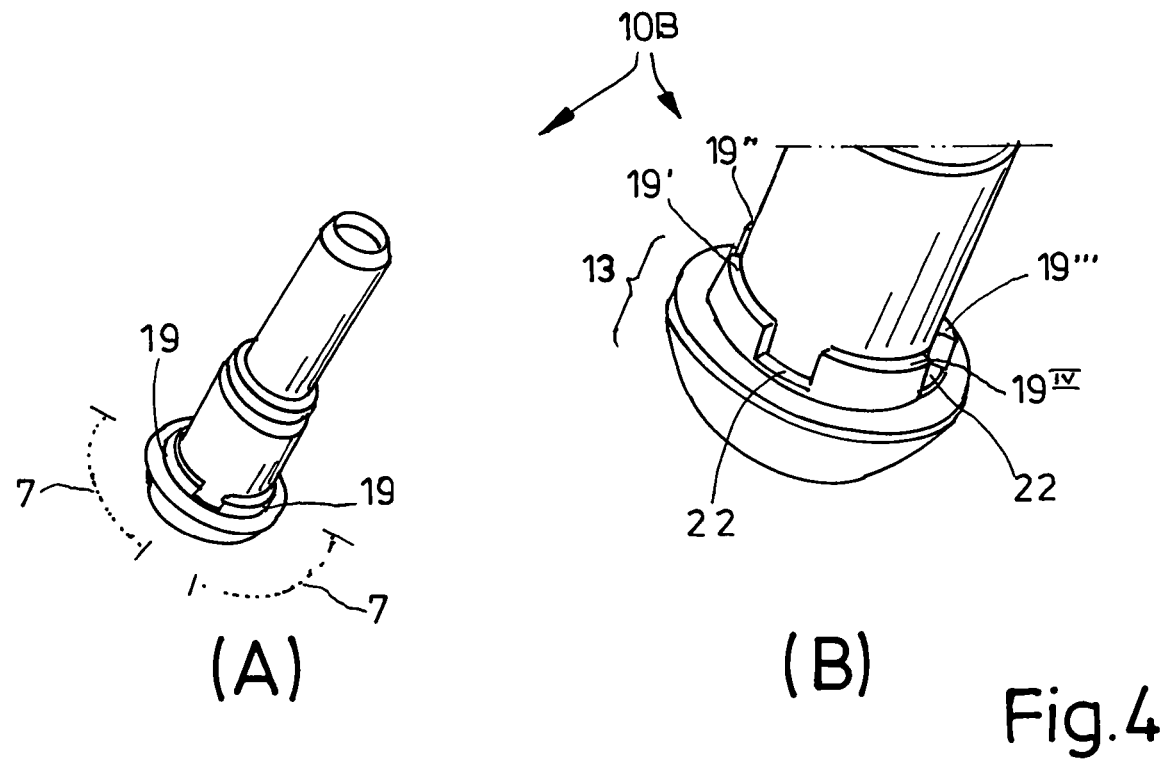

TIRE VALVE HAVING A STEPPED SHOULDER

BACKGROUND OF THE INVENTION

The invention relates to a tire valve, in particular a gas and/or pneumatic tire valve, comprising a valve body which penetrates a bore in a rim, in particular a vehicle rim, embodies a lower valve body portion disposed on one side of the rim, in particular in the interior of the rim, in the mounted state as well as an upper valve body portion protruding from the rim bore, and is configured so as to cooperate with a cap nut in the region of the upper valve body portion. The invention further relates to a valve system and a tire.

Various approaches are known in the art for producing, to prevent loss of air, a seal between a pneumatic tire valve and the valve bore (referred to hereinafter also as the rim bore) surrounding said pneumatic tire valve in the pneumatic tire rim. On the one hand there are what are known as shoulder or flat seals such as, for example, in DE 28 13 742. On the other hand O-ring seals are used.

However, both solutions are, viewed per se, technically disadvantageous: A shoulder or flat seal, which typically consists of a flat rubber ring and is optionally provided with a shoulder portion, places relatively low demands on the flatness of the bearing surface (i.e. the external flat edge portion of the rim bore) and on the hole tolerances of this rim bore, as the large rubber volume of seals of this type easily compensates for deviations. A drawback however is that during the fitting of valves comprising seals of this type, (low) torque limits may not be exceeded: this would lead to the destruction of the seal. As, in addition, the sealing elements become deformed under pressure, very low loosening moments for the cap nut fastening the valve are generally and disadvantageously obtained.

The known O-ring seals, on the other hand, allow very much higher tightening moments, as the cap nut acts directly on the edge portion of the rim bore and metal-to-metal contact thus exists; advantageously, accordingly high loosening moments can be achieved for the fastening cap nut. On the other hand, it is disadvantageous that an O-ring seal of this type places very high demands on the flatness of the bearing surface in the rim bore edge region and on the bore tolerances themselves, so that in some cases considerable additional costs for production and assembly are necessary in this case.

According to DE 20 2004 020 121 U1, the aforementioned drawbacks are eliminated by a tire valve in which the lower valve body portion forms an annular shoulder which offers an abutment for a flat edge portion of the rim bore, into which an annular groove, which is open toward the edge portion, is shaped and in which the edge portion can be braced by tightening the cap nut. In addition, a specific molded seal is provided for sealing the rim bore. According to this solution, the molded seal is provided to be inserted into the annular shoulder. Although the tire valve proposed in this form allows, through the annular shoulder, the pressing of the valve seal to be limited, it has, as a result of the annular shoulder with the inner valve seal, a comparatively large maximum diameter. As a result, the tire valve proves to be comparatively large for certain applications. In particular, it has been found that the maximum diameter of a tire valve of this type proves in many cases to be too large for a radius of transition from a well base to the dropped center of a rim. A tire valve of the type mentioned at the outset is described in DE 103 14 783 A1 but is still capable of improvement.

SUMMARY OF THE INVENTION

A tire valve which can be integrated in an improved manner into such a transition radius of a rim and generally can be handled in an improved manner, even at narrow points of a rim, would be desirable.

This is the starting point of the invention, the object of which is to disclose a tire valve of the type mentioned at the outset that has improved geometry while still being able to limit excessive pressing of a valve seal.

The object is achieved by the invention by means of the tire valve mentioned at the outset in which, according to the invention, the features of which are described herein. The lower valve body portion forms a stop collar which is in the form of a stepped shoulder and offers an abutment for a flat edge portion of the rim bore, which stop collar broadens the lower valve body portion relative to the upper valve body portion beyond an internal width of the rim bore, and against which the edge portion can be braced by tightening the cap nut.

The invention starts from the consideration that it should be possible to design a tire valve so as to be comparatively slender in its geometry with regard to narrow transition radii in the rim well, in particular with regard to a comparatively narrow radius of transition from the well base to the dropped center of a rim well. In particular, the invention starts from the consideration that it should be possible to reduce a maximum diameter of the tire valve disclosed in DE 20 2004 020 121 U1, wherein the basic advantages disclosed therein of a tire valve should be maintained. The invention has recognized that an annular shoulder disclosed therein can be replaced in an inventive manner by a stop collar which defines a first broadening that broadens the lower valve body portion relative to the upper valve body portion beyond an internal width of the rim bore. The stop collar forms a novel limitation of the pressing of a valve seal, in particular a ring seal, as the stop collar rests in the mounted state against an inside of the rim, in particular rests on the flat bordering of a rim hole. The first broadening of the stop collar broadens the lower valve body portion relative to the upper valve body portion, in particular continuously in the radial direction, i.e. without interruption or unnecessary further broadening in the radial direction, beyond an internal width of the rim bore. The invention has recognized that a rim seal can be attached outside the stop collar, i.e. surrounding the stop collar. According to the invention, the lower valve body portion has a further broadening following the stop collar toward the side for holding a ring seal. In contrast to the aforementioned prior art, this has the advantage that a rim seal at the outer region of the tire valve can adapt, like a molded rubber seal, to a radius, in particular a radius of transition from the well base to the dropped center of a rim. In an advantageous manner, an improved sealing effect is achieved even in the region of the aforementioned transition radius and, in addition, limitation of deformation of a rim seal is achieved owing to the stop collar. This has the advantage that, in particular, overloading of an elastomer material of a rim seal by any excessive torque of a cap or collar nut is avoided. In addition, this also has the advantage of avoiding a loss of the tightening moment in the screwing as a result of any relaxation of a rim seal.

Advantageous developments of the invention may be inferred from this description which discloses in detail advantageous possibilities for implementing the above-mentioned design within the scope of the object set, and with regard to further advantages.

In particular, the stop collar of the lower valve body portion is configured so as continuously to broaden in the radial direction. Expediently, a stop surface which continuously broadens the lower valve body portion and extends continuously in the radial direction is in this case provided. This avoids an unnecessarily high maximum diameter of the lower valve body portion and secure abutment against the flat bordering of a rim hole is achieved. The stop collar can, as required, completely surround the lower valve body portion or broaden it only in one or more partial circumferential regions. The former variant allows especially good abutment of the ring seal whereas the latter variant leads, while maintaining this advantage, to a saving in material and reduction in weight of the valve.

In particular, the stop collar has an outer diameter which is smaller than an inner diameter of an associated valve seal, in particular an associated ring seal. Expediently, an outer diameter is for this purpose designed so as precisely to fit the inner diameter of a valve seal, in particular a ring seal. Owing to the ring seal which is "external" in the described manner, a sealing effect is improved within the scope of the above-described design, as said ring seal can advantageously be fitted in the transition radius of a rim well.

The invention also leads to a valve system comprising a tire valve of the above-described type and a ring seal, the stop collar being according to the invention surrounded by the ring seal.

The invention also leads to a tire comprising a rim and a tire valve of the above-described type.

Exemplary embodiments of the invention will now be described hereinafter with reference to the drawings. Said drawings are not necessarily intended to be a true-to-scale representation of the exemplary embodiments; on the contrary, the drawings, where they serve to describe the invention, are presented in schematic and/or slightly distorted form. With regard to additions to the teachings which are immediately apparent from the drawings, reference is made to the relevant prior art. It should be borne in mind in this regard that a broad range of modifications and alterations concerning the form and the detail of an embodiment can be carried out without departing from the general idea of the invention. The features of the invention that are disclosed in the foregoing description, in the drawings and in the claims can be instrumental, both individually and in any desired combination, to developing the invention. The general idea of the invention is not limited to the exact form or the detail of the preferred embodiment shown and described hereinafter or limited to a subject-matter which would be restricted compared to the subject-matter claimed in the claims. For specified ranges of dimensions, values lying within the mentioned limits are intended also to be disclosed as limit values and to be able to be used and claimed as desired.

BRIEF DESCRIPTION OF THE DRAWINGS

To improve understanding of the invention, a preferred embodiment of the invention will now be described with reference to the figures of the drawings, in which:

FIG. 3 is a perspective view (A) and an enlarged detailed view (B) of a further particularly preferred embodiment of a tire valve; and FIG. 4 is a perspective view (A) and an enlarged detailed view (B) of still a further particularly preferred embodiment of a tire valve.

DETAILED DESCRIPTION

Figure 1:
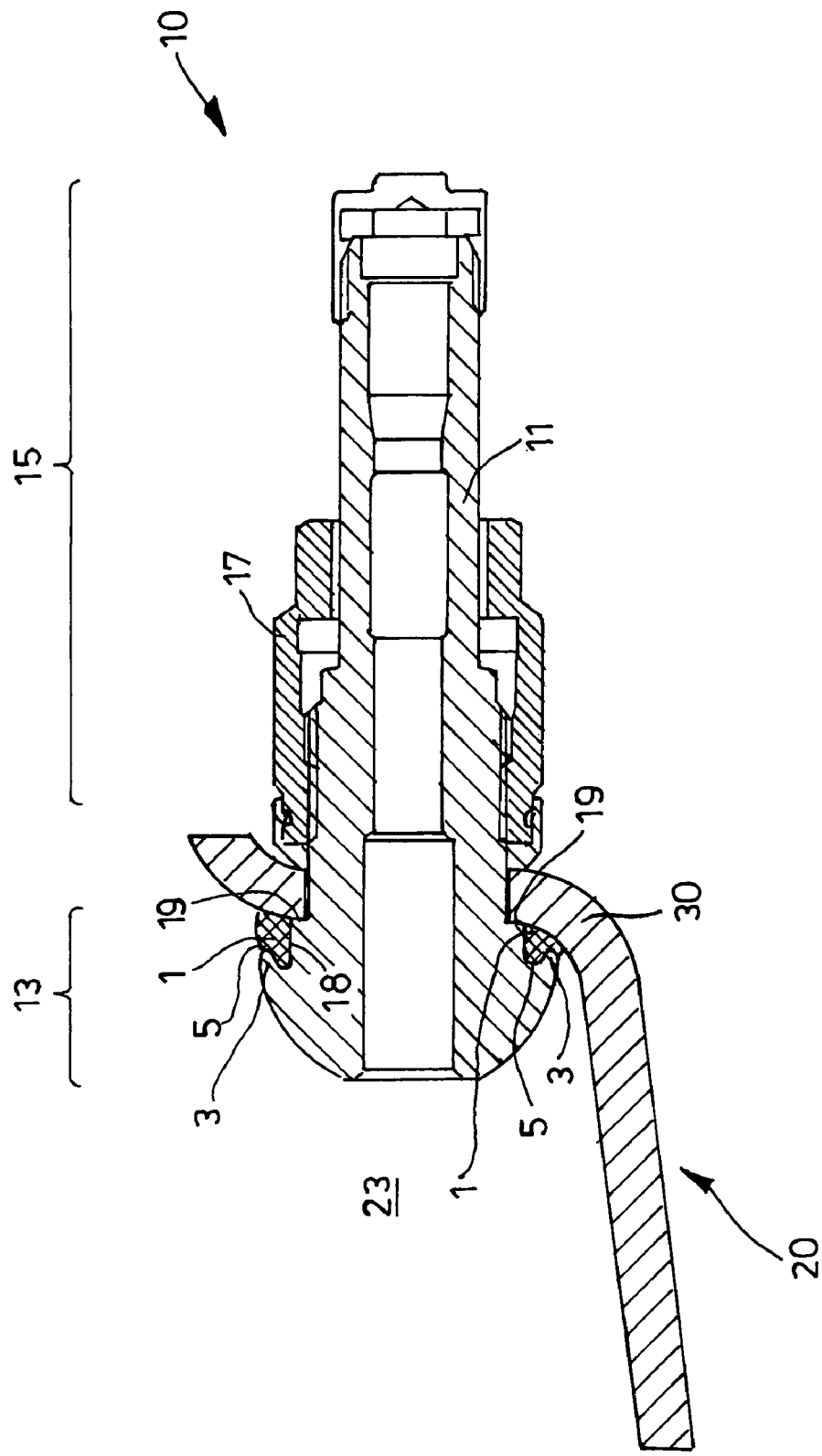
FIG. 1 shows a particularly preferred embodiment of a tire valve according to the design of the invention.
Figure 2:
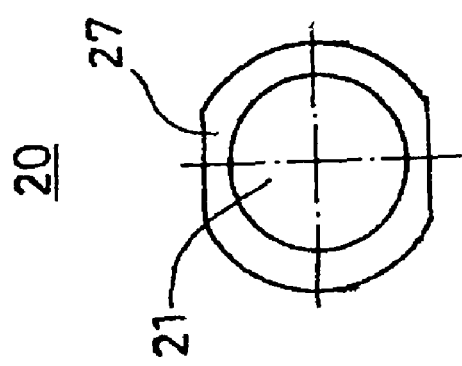
FIG. 2 is a plan view, provided with dimensions, onto a rim hole serving to receive a tire valve according to FIG. 1.

FIG. 1 is a schematic sectional view of a particularly preferred embodiment of a tire valve 10 in the form of a pneumatic tire valve. The valve body 11 penetrates in the mounted state a rim bore 21 (shown in greater detail in FIG. 2) of a rim 20 (not shown in greater detail), in the present case a vehicle rim. The side of the rim 20 that is denoted in the present case by reference numeral 23 is the interior of the rim (which will not be disclosed in greater detail) into which the lower valve body portion 13 protrudes in the mounted state, whereas the upper valve body portion projects outward beyond the rim 20. The tire valve 10 is in this case provided, in the region of the upper valve body portion 15, with a thread (which will not be described in greater detail) for cooperating with a cap nut 17. By tightening the cap nut 17, the valve body 11 is drawn with its lower valve body portion 13 against the well of the rim 20. According to the design of the invention, the lower valve body portion 13 forms a stop collar 19 offering an abutment for the flat edge portion 27 (illustrated in greater detail in FIG. 2) of the rim bore 21. According to the design of the invention, this reliably secures the valve body 11 to the well of the rim 20. Unnecessarily high pressing of the seal surrounding the stop collar 19 is in this case avoided. According to the design of the invention, the embodiment shown in FIG. 1 of the tire valve 10 provides for the stop collar 19 to broaden the lower valve body portion 13 relative to the upper valve body portion 15 beyond an internal width of the rim bore 21. In particular, a stop surface, which continuously broadens the lower valve body portion 13 and extends continuously in the radial direction, of the stop collar 19 is provided in the present embodiment. The stop collar 19 can in this case completely surround the lower valve body portion 13 (FIG. 3) or broaden said lower valve body portion only in one or more partial circumferential regions (FIG. 4). Said stop collar is formed in the form of a stepped shoulder which is in turn surrounded by a ring seal 1. Accordingly, the outer diameter of the stop collar 19 is designed so as precisely to fit the inner diameter the inner diameter of the ring seal 1. Unnecessary broadening of the valve body 11 in the region in direct proximity to the well of the rim 20 is thus avoided. On the contrary, the ring seal 1, which lies outside the stop collar 19, provides an improved sealing effect in the region of the radius 30 of transition between the well base and the dropped center of the rim 20.

According to the present embodiment, this is additionally supported as a result of the fact that the lower valve body portion 13 has a further broadening 3 following the stop collar 19 toward the interior 23 of the rim for holding the ring seal 1. The further broadening 3 surrounds in this case the lower valve body portion 13 completely and is formed in the form of an annular shoulder comprising a groove encircling in the annular support surface. The groove 5 serves in this case at least partly to receive the ring seal 1 and holds said ring seal in the mounted state against the well of the rim 20. In an advantageous manner, as a result of the cooperation of the stop collar 19 and the further broadening 3, on the one hand excessive pressing of the ring seal 1 is avoided and on the other hand advantageous fitting of the ring seal 1 in the transition radius 30 is achieved. In other words, the ring seal 1 is deformed to a sufficient extent to increase the sealing effect but not excessively. Accordingly, a lateral surface 18, formed between the stop collar 19 and further broadening 3, of the lower valve body portion 13 is configured in this embodiment in a particular manner for abutment of the ring seal 1. In the mounted state, the lateral surface 18 has a height corresponding—as shown in FIG. 1—almost to the height of the deformed ring seal 1, the ring seal 1 extending between the wider broadening 3 and the rim 20. A suitable fit of the ring seal 1 is achieved as a result of the fact that the ring seal 1 has, in the non-mounted state of the tire valve 10, a height lying somewhat above the height of the lateral surface 18 of the lower valve body portion 13 so that, during the mounting of the tire valve 10, the ring seal 1 is slightly compressed in accordance with the design of the invention and in this case has its sealing effect in an optimized manner, excessive pressing of the ring seal 1 by the stop collar 19 being avoided.

FIG. 3 is a perspective view (A) and an enlarged detailed view (B) of a further preferred embodiment of a tire valve 10A. In the present case, the stop collar 19 surrounds the lower valve body portion 13 completely. A groove 4, which can advantageously serve to hold a ring seal (not illustrated in greater detail here), is formed between the stop collar 19 and a subsequent further broadening 3. That is to say, if the ring seal becomes deformed or if a molded ring seal is used, said ring seal can be pressed into the groove 4 under adaptation to a rim well shown in FIG. 1, in particular under adaptation to a transition radius 30. Under partial deformation of the ring seal 1, this leads to improved mounting of the ring seal and to an increase in the sealing effect.

FIG. 4 is a perspective view (A) and an enlarged detailed view (B) of a further embodiment of a tire valve 10B. In the present case, the stop collar 19 broadens the lower valve body portion 13 only in a plurality of partial circumferential regions 7 which are indicated by broken lines. In other words, the stop collar 19 is formed in the form of a step which continuously broadens the lower valve body portion in the radial direction and extends only over a partial circumferential region 7 of the lower valve body portion 13 or, to put it differently, a basically complete stop collar 19, such as is shown for example in FIG. 3, is segmented along the circumference of the lower valve body portion 13 and therefore consists of a plurality of stop collars 19', 19'', 19''', 19'''', such as are shown in the enlarged detailed view B in FIG. 4. In addition to a reduction in material and weight on the tire valve 10B, the gaps 22 provide in turn an advantageous holding function for a ring seal 1 (not illustrated in greater detail) which can fit partly into a gap 22, under partial deformation of said ring seal, in particular in a transition radius 30 (illustrated in greater detail in FIG. 1). This also increases a sealing effect.

The invention claimed is:

1. A tire valve (10), comprising: a valve body (11) which penetrates a bore (21) in a rim (20), the valve body having a lower valve body portion (13) disposed on one side (23) of the rim (20) in the mounted state as well as an upper valve body portion (15) protruding from the rim bore (21), the valve body being configured so as to cooperate with a cap nut (17) in the region of the upper valve body portion (15), the lower valve body portion (13) forming a stop collar (19) which defines an abutment for a flat edge portion (27) of the rim bore (21) and defines a first broadening which broadens the lower valve body portion (13) relative to the upper valve body portion (15) beyond an internal width of the rim bore (21), and against which the edge portion (27) can be braced by tightening the cap nut (17), wherein the stop collar (19) is formed in the form of a stepped shoulder, the lower valve body portion (13) having a further broadening (3) following the stop collar (19) toward the one side (23) for holding a ring seal (1), and wherein the stepped shoulder of the stop collar has, in a sectional view, a rectangular shape.

2. The tire valve (10) as claimed in claim 1, wherein the stop collar (19) is configured so as continuously to broaden the lower valve body portion (13) in the radial direction and extends continuously in the radial direction.

3. The tire valve (10) as claimed in claim 1, wherein the stop collar (19) completely surrounds the lower valve body portion (13).

4. The tire valve (10) as claimed in claim 1, wherein the stop collar (19) broadens the lower valve body portion (13) only in one or more partial circumferential regions.

5. The tire valve (10) as claimed in claim 1, wherein the stop collar (19) has an outer diameter which is smaller than an inner diameter of the ring seal (1).

6. A valve system comprising a tire valve (10) as claimed in claim 1, wherein the stop collar (19) has an outer diameter which is designed so as precisely to fit an inner diameter of the ring seal (1).

7. The tire valve (10) as claimed in claim 1, wherein the lower valve body portion (13) is provided to be disposed in the interior of the rim.

8. The tire valve (10) as claimed in claim 1, wherein a groove is formed between the stop collar (19) and the further broadening (3).

9. The tire valve (10) as claimed in claim 1, wherein the further broadening (3) completely surrounds the lower valve body portion (13).

10. The tire valve (10) as claimed in claim 1, wherein the further broadening (3) is formed in the form of an annular shoulder comprising a groove (5) in a surface of the annular shoulder and configured at least partly to receive the ring seal (1).

11. The tire valve (10) as claimed in claim 1, wherein a lateral surface (18) formed between the stop collar (19) and the further broadening (3) of the lower valve body portion (13) is configured for abutment of the ring seal (1), the ring seal (1) extending between the further broadening (3) and the rim (20).

12. A valve system comprising a tire valve (10) as claimed in claim 1 and the ring seal (1), wherein the stop collar (19) is surrounded by the ring seal (1).

13. The valve system as claimed in claim 12, wherein a lateral surface (18) formed between the stop collar (19) and the further broadening (3) of the lower valve body portion (13) is configured for abutment of the ring seal (1), and has a height which in the non-mounted state is less than the height of the ring seal (1).

14. A tire comprising a rim (20) and a tire valve (10) as claimed in claim 1.

15. The tire valve (10) as claimed in claim 2, wherein the stop collar (19) has a stop surface which continuously broadens the lower valve body portion (13) and extends continuously in the radial direction.

16. The tire valve (10) as claimed in claim 11, wherein the lateral surface (18) formed between the stop collar (19) and the further broadening (3) of the lower valve body portion (13) has a height corresponding in the mounted state almost to the height of the ring seal (1).

17. The valve system as claimed in claim 12, wherein a lateral surface (18) formed between the stop collar (19) and the further broadening (3) of the lower valve body portion (13) has a height corresponding in the mounted state almost to the height of the ring seal (1).

18. The tire valve (10) as claimed in claim 1, wherein the abutment is defined substantially parallel to an inner surface of the rim and wherein the stop collar (19) defines a broadened diameter with respect to the upper valve body portion (15) which is defined by a lateral surface extending from the stop collar to the further broadening substantially parallel to a longitudinal axis of the tire valve (10).

* * * * *